(12) United States Patent
Onose

(10) Patent No.: US 11,298,776 B2
(45) Date of Patent: Apr. 12, 2022

(54) FRICTION WELDING METHOD AND FRICTION WELDING APPARATUS

(71) Applicant: NITTAN VALVE CO., LTD., Hadano (JP)

(72) Inventor: Ryo Onose, Shimonoseki (JP)

(73) Assignee: NITTAN VALVE CO., LTD., Hadano (JP)

( * ) Notice: Subject to any disclaimer, the term of this patent is extended or adjusted under 35 U.S.C. 154(b) by 400 days.

(21) Appl. No.: 16/271,831

(22) Filed: Feb. 10, 2019

(65) Prior Publication Data

US 2019/0168335 A1 Jun. 6, 2019

Related U.S. Application Data

(63) Continuation-in-part of application No. PCT/JP2016/073586, filed on Aug. 10, 2016.

(51) Int. Cl.
*B23K 20/00* (2006.01)
*B23K 20/12* (2006.01)
(Continued)

(52) U.S. Cl.
CPC ............ *B23K 20/121* (2013.01); *B23K 20/12* (2013.01); *B23K 20/129* (2013.01);
(Continued)

(58) Field of Classification Search
CPC ........ B23K 20/12; B23K 20/121; B23K 9/08; B23K 20/129; B23K 20/02; B23K 37/04;
(Continued)

(56) References Cited

U.S. PATENT DOCUMENTS

2006/0043155 A1* 3/2006 Lovin .................. B23K 20/121
228/102
2017/0326667 A1* 11/2017 Buchler ............... B23K 9/0737

FOREIGN PATENT DOCUMENTS

JP H7-100669 A 4/1995
JP H9-47885 A 2/1997
(Continued)

OTHER PUBLICATIONS

International Search Report (ISR; Written Opinion I), corrected International Search Report (corrected ISR; corrected Written Opinion I), and International Preliminary Report on Patentability (IPRP; Written Opinion II) in PCT/JP2016/073586, which was filed on Aug. 10, 2016, which published as WO 2018 029812 A1 on Feb. 15, 2018, and which is the parent application of which the present application is a continuation-in-part (CIP).

*Primary Examiner* — Erin B Saad
(74) *Attorney, Agent, or Firm* — JTT Patent Services, LLC; Gerald T. Peters

(57) ABSTRACT

A friction welding method comprises causing an end surface of a first workpiece and an end surface of a second workpiece to engage in relative rotation while the end surfaces are in mutual contact as a compressive load is applied thereto so as to generate heat due to friction at a joint interface between the workpieces, thereafter stopping the relative rotation of the workpieces, and then applying an upset process pressure to the workpieces. When the workpiece end surfaces are brought into mutual contact, a compressive load employed is less than a lower threshold of a bend-producing compressive load domain within which bending of the first workpiece and/or the second workpiece would occur but the compressive load and the relative rotational speed between
(Continued)

the workpieces are such as will cause the heat due to friction to be capable of causing plastic deformation at workpiece end surface(s).

12 Claims, 9 Drawing Sheets

(51) Int. Cl.
*B23K 20/227* (2006.01)
*B23K 20/24* (2006.01)
*B23K 103/04* (2006.01)
*B23K 103/18* (2006.01)
*B23K 101/06* (2006.01)
*B23K 101/00* (2006.01)

(52) U.S. Cl.
CPC ............ *B23K 20/227* (2013.01); *B23K 20/24* (2013.01); *B23K 2101/006* (2018.08); *B23K 2101/06* (2018.08); *B23K 2103/04* (2018.08); *B23K 2103/05* (2018.08); *B23K 2103/18* (2018.08)

(58) Field of Classification Search
CPC ...... B23K 9/02; B23K 20/00; B23K 20/1205; B23K 20/227; B23K 20/26; B23K 2101/001; B23K 2101/04; B23K 2101/06; B23K 2103/04; B23K 2103/06; B23K 2103/18; B23K 9/0732; B23K 9/0737; B23K 9/1087
See application file for complete search history.

(56) References Cited

FOREIGN PATENT DOCUMENTS

| | | |
|---|---|---|
| JP | H11-156562 A | 6/1999 |
| JP | 2000-202648 A | 7/2000 |

\* cited by examiner

| Test No. | B/M | No.1 | No.2 | No.3 | No.4 | No.5 | No.6 | No.7 | No.8 | No.9 | No.10 |
|---|---|---|---|---|---|---|---|---|---|---|---|
| Number of tests | 25 | 10 | 10 | 10 | 10 | 10 | 10 | 10 | 10 | 10 | 10 |
| Unit | 0.01mm | 0.01mm | 0.01mm | 0.01mm | 0.01mm | 0.01mm | 0.01mm | 0.01mm | 0.01mm | 0.01mm | 0.01mm |
| MAX | 32 | 32 | 22 | 41 | 12 | 11 | 36 | 11 | 13 | 41 | 29 |
| MIN | 12 | 7 | 5 | 9 | 3 | 3 | 10 | 3 | 5 | 7 | 13 |
| AVG | 22.04 | 20.80 | 12.70 | 21.70 | 8.33 | 6.50 | 23.10 | 6.20 | 8.80 | 24.30 | 21.30 |
| R | 20 | 25 | 17 | 32 | 9 | 8 | 26 | 8 | 8 | 34 | 16 |

| Test No. | No.11 | No.12 | No.13 | No.14 | No.15 | No.16 | No.17 | No.18 | No.19 | No.20 |
|---|---|---|---|---|---|---|---|---|---|---|
| Number of tests | 10 | 10 | 10 | 10 | 25 | 10 | 10 | 25 | 10 | 10 |
| Unit | 0.01mm | 0.01mm | 0.01mm | 0.01mm | 0.01mm | 0.01mm | 0.01mm | 0.01mm | 0.01mm | 0.01mm |
| MAX | 31 | 22 | 21 | 10 | 13 | 11 | 14 | 11 | 11 | 13 |
| MIN | 12 | 14 | 8 | 1 | 1 | 4 | 7 | 3 | 2 | 6 |
| AVG | 22.40 | 16.50 | 14.30 | 6.70 | 5.68 | 7.40 | 9.40 | 5.60 | 7.10 | 8.60 |
| R | 19 | 8 | 13 | 9 | 12 | 7 | 7 | 8 | 9 | 7 |

FIG. 6

| | | Main shaft rotational speed [rpm] | | | | | | | | | |
|---|---|---|---|---|---|---|---|---|---|---|---|
| | | 1000 | 1250 | 1500 | 1750 | 2000 | 2250 | 2500 | 2750 | 3000 | 3600 |
| P0 (Load) [kN] | 0.5 | | | No.10 | | No.11 | | No.12 | | No.13 | |
| | 1.0 | No.1 | | No.4 | | No.7 | | No.14 | | No.15 | No.18 |
| | 2.0 | No.2 | No.16 | No.5 | | No.8 | | No.17 | | No.19 | No.20 |
| | 4.0 | No.3 | | No.6 | | No.9 | | | | | |

FIG. 7

FRICTION WELDING METHOD AND FRICTION WELDING APPARATUS

CROSS-REFERENCE TO RELATED APPLICATION, BENEFIT CLAIM, AND INCORPORATION BY REFERENCE

This application is a continuation-in-part of and claims benefit under 35 USC 120 and 365(c) to copending International Application No. PCT/JP2016/073586, entitled "Friction Welding Method and Friction Welding Apparatus", filed 8 Oct. 2016, the content of which is incorporated herein in its entirety by reference.

FIELD OF THE INVENTION

The present invention relates to a friction welding method and a friction welding apparatus.

BACKGROUND

Referring to FIG. 8, an engine valve for an automobile might comprise a stem serving as first workpiece W1, and a valve head serving as second workpiece W2 integrally formed at one end of the stem. In particular, when the engine valve is used as an exhaust valve, the valve head, because it will be exposed to combustion gas from the combustion chamber and exhaust passages, preferably has high heat resistance. In contrast, the heat resistance of the stem generally need not be as high as that of the valve head. This being the case, there are valves in which a valve head member made of a metal having high heat resistance is integrally joined by means of friction welding to a stem member made of a metal having lower heat resistance but excellent mechanical strength, for example. A valve made by such a process may be advantageous because it may permit achievement of both durability and cost reduction as a result of judicious selection of metals having properties respectively suitable for the valve head and the valve stem.

One method for integrally joining two or more workpieces such as workpiece W1 and workpiece W2 shown in FIG. 8 is friction welding. In accordance with such friction welding method, end surfaces of any two such workpieces to be integrally joined might be made to engage in relative rotation while the end surfaces are in mutual contact as a compressive load is applied thereto so as to generate heat due to friction at a joint interface between the workpieces (friction process), following which the relative rotation of the workpieces is stopped, and an upset pressure is applied to the workpieces to integrally join the workpieces to each other (upset process). Such a friction welding method may make it possible to perform welding without use of a heat source other than the heat which is generated due to friction, and may make it possible to perform welding without use of welding rod(s) and flux, for example.

However, as shown in FIG. 3, it may sometimes happen during friction welding that a first workpiece is joined to a second workpiece in a bent or buckled state. Such bending or buckling may occur, for example, when the upset pressure is applied to the workpieces.

With continued reference to FIG. 3, when friction welding is performed, the shaft member serving as the first workpiece W1 might for example be joined in a bent manner to the shaft portion W22 of the head member serving as the second workpiece W2. At FIG. 3, note that reference numeral CH denotes a region of the shaft member W2 that is held by the chuck unit 5.

The present inventor has been studying this bending phenomenon and has found that the quality of the surfaces at the end surface of the shaft portion W22 of the head member W2 and the end surface of the shaft member W1 (particularly the quality of the surface at the end surface of the shaft member W1) and the friction-producing pressure (compressive load) affect the tendency for the bending phenomenon to occur. For example, the states of the end surfaces (e.g., whether the surface is inclined and/or curved) such as may result from differences produced by cutting tools (e.g., a shearing device that may be used to produce the end faces of the workpieces) is thought to be particularly capable of influencing the tendency for the bending phenomenon to occur.

Because such buckling or bending will result in defective parts and low manufacturing yield, there is therefore a need for a method and an apparatus that will reliably prevent occurrence of such buckling and/or bending.

SUMMARY OF INVENTION

A first object of the present invention is to provide a friction welding method which is capable of accurately joining a first workpiece and a second workpiece without causing bending or buckling of the workpieces while ensuring that the friction process portion of the friction welding method is properly performed.

A second object of the present invention is to provide a friction welding apparatus that is capable of carrying out such a friction welding method.

The present invention was conceived in view of the foregoing situation after giving careful attention to the relationship among compressive load, rotational speed, and the end surface states of the workpieces; e.g., irregularities at the workpiece end surface(s) that may increase the tendency of the workpiece(s) to bend and/or buckle.

Friction welding methods in accordance with embodiments of the present invention may comprise any of (1) to (5), below.

(1) A friction welding method of causing relative rotation between an end surface of a first workpiece and an end surface of a second workpiece while the end surfaces of the workpieces are in mutual contact as a compressive load is applied thereto so as to generate heat due to friction at a joint interface between the workpieces, thereafter stopping the relative rotation of the workpieces, and then applying an upset pressure to the workpieces, wherein when the end surface of a first workpiece and the end surface of the second workpiece are brought into contact with each other, the compressive load employed is less than a lower threshold of a bend-producing compressive load domain that would cause bending of at least one of the first workpiece and the second workpiece but the compressive load and the relative rotation between the workpieces are such as will produce heat due to friction capable of causing occurrence of plastic deformation at the workpiece end surfaces.

According to this configuration, focusing attention on the fact that the compressive load and the end surface state of the workpieces are factors causing bending of the first workpiece and/or the second workpiece when the end surface of the first workpiece and the end surface of the second workpiece are brought into contact with each other, the compressive load employed is less than the lower threshold of a bend-producing compressive load domain that would cause bending of the first workpiece and/or the second workpiece at the time of contact between the end surfaces of the workpieces, so that the first workpiece and the second workpiece can be prevented from becoming bent or buckled by adjusting (reducing) the compressive load which acts thereon at a time when the workpieces would otherwise be most susceptible to influence by the end surface states of the workpieces. Furthermore, since the compressive load and the relative rotation between the workpieces are such as will cause the heat due to friction to be capable of causing plastic deformation at workpiece end surface(s), irregularities at the workpiece end surface(s) can be corrected, i.e., the end surface state(s) can be altered so as to be less likely to cause bending and/or buckling of the first workpiece and/or the second workpiece, following which it will be possible to cause the compressive load to be made higher than the compressive load at the time of contact between the end surfaces of both workpieces, so that the heat due to friction required for the friction process can be ensured. Therefore, one or more embodiments of the present invention can provide a friction welding method capable of accurately joining the first workpiece and the second workpiece without causing bending or buckling thereof while ensuring a properly performed friction process.

(2) In the context of the configuration of (1),
when the end surface of the first workpiece and the end surface of the second workpiece are brought into contact with each other, the compressive load employed is closer to the lower threshold of the bend-producing compressive load domain than it is to an upper limit of a non-plastically-deforming compressive load domain within which heat due to friction capable of causing plastic deformation of the workpiece end surfaces is not generated.

According to this configuration, by utilizing the fact that when yield stress is higher, the temperature for achieving the yield stress becomes lower, the compressive load can be increased as much as possible to quickly at least partially plastically deform the end surfaces of the workpieces. This makes it possible for the process by end surface irregularities of the workpieces are corrected to be carried out quickly.

(3) In the context of the configuration of (1),
after the end surfaces of the workpieces are brought into contact with each other, at least the compressive load may be made higher than the compressive load at the time of contact between the end surfaces of the workpieces to make the heat due to friction higher than the heat due to friction at the time of contact between the end surfaces of the workpieces.

According to this configuration, a transition to the main friction process can be made while preventing bending/buckling from occurring at the workpieces at the time of contact between the end surfaces of the workpieces, so that the workpieces can accurately be joined without causing bending/buckling thereof.

(4) In the context of the configuration of (3),
after the end surfaces of the workpieces are brought into contact with each other, the relative rotational speed of the workpieces is made higher than the relative rotational speed at the time of contact between the end surfaces of the workpieces.

According to this configuration, not only the compressive load but also the relative rotational speed of the workpieces can be made higher to increase the generation of heat due to friction, and even if unique processing is performed at the time of contact between the end surfaces of the workpieces, the heat due to friction required in the friction process can reliably be generated.

(5) In the context of the configuration of (1),
the relative rotational speed of the workpieces is maintained constant while the heat due to friction is generated.

According to this configuration, the relative rotational speed of the workpieces can be set to a single rotational speed (when at steady-state) throughout the friction process, so that not only is it possible for a first workpiece and a second workpiece to be accurately joined without causing occurrence of bending/buckling while ensuring that the friction process is properly performed, but it is also for rotational speed control to be simplified.

Friction welding apparatuses in accordance with embodiments of the present invention may comprise any of (6) to (9), below.

(6) A friction welding apparatus that causes relative rotation between an end surface of a first workpiece and an end surface of a second workpiece while the end surfaces of the workpieces are in mutual contact as a compressive load is applied thereto so as to generate heat due to friction at a joint interface between the workpieces, thereafter stopping the relative rotation of the workpieces, and then applying an upset pressure to the workpieces, the friction welding apparatus comprising:

a pair of holding devices each having a chuck unit holding a workpiece and arranged with the chuck parts facing each other;

a movement drive source associated in a drivable manner with at least one of the paired holding devices and moving the workpieces respectively held by the chuck parts of the pair of holding devices in a relatively approaching direction;

a rotary drive source associated in a rotationally drivable manner with at least one of the chuck parts of the pair of holding devices and relatively rotating the workpieces held by the chuck parts;

a compressive load detecting unit detecting a compressive load which acts between the end surfaces of the workpieces held by the chuck parts of the pair of holding devices which press against each other; and a control unit controlling the movement drive source and the rotary drive source based on information from the compressive load detecting unit when the end surfaces of the workpieces held by the chuck parts of the pair of holding devices are brought into contact with each other, so that the compressive load acting between the end surfaces of the workpieces which press against each other is less than a lower threshold of a bend-producing compressive load domain that would cause bending of the workpieces but the compressive load and the relative rotational speed between the workpieces are such as will cause the heat due to friction which is generated between the workpiece end surfaces to be capable of causing plastic deformation between the workpiece end surfaces.

This configuration is specifically adapted to provide an apparatus capable of performing the friction welding method according to (1).

(7) In the context of the configuration of (6),
the control unit is set to control the movement drive source when the end surfaces of the workpieces held by the chuck parts of the pair of holding devices are brought into contact with each other, so that the compressive load acting between the end surfaces of the workpieces pressing each other is made closer to the lower threshold of the bend-producing compressive load domain than it is to an upper limit of a non-plastically-deforming compressive load domain within which heat due to friction capable of causing plastic deformation of the workpiece end surfaces is not generated.

This configuration is specifically adapted to provide an apparatus capable of performing the friction welding method according to (2).

(8) In the context of the configuration of (6), the control unit is set to control the movement drive source so that after the end surfaces of the workpieces are brought into contact with each other, at least the compressive load acting between the end surfaces of the workpieces which press against each other is made higher than the compressive load at the time of contact between the end surfaces of the workpieces.

This configuration is specifically adapted to provide an apparatus capable of performing the friction welding method according to (3).

(9) In the context of the configuration of (6), the control unit includes a storage unit storing as setting information the rotational speed of the rotary drive source and the compressive load at the time of contact between the end surfaces of the workpieces, and a controller controlling the movement drive source and the rotary drive source based on the information from the compressive load detecting unit and the setting information stored in the storage unit when the end surfaces of the workpieces held by the chuck parts of the pair of holding devices are brought into contact with each other, so as to press the end surfaces of the workpieces against each other in such fashion that the compressive load acting therebetween is less than the lower threshold of the bend-producing compressive load domain but the compressive load and the relative rotational speed between the workpieces are such as will cause generation of heat due to friction between the workpiece end surfaces which is capable of causing plastic deformation to occur between the workpiece end surfaces as a result of that heat due to friction.

This configuration is further specifically adapted to provide the friction welding apparatus according to (6), above.

Embodiments of the present invention as described above make it possible to provide a friction welding method and/or apparatus capable of accurately joining a first workpiece and a second workpiece without causing bending or buckling of the workpieces while ensuring that the friction process portion of the friction welding method is properly performed.

BENEFIT OF INVENTION

As described above, one or more embodiments of the present invention make it possible to provide a friction welding method which is capable of accurately joining a first workpiece and a second workpiece without causing bending and/or buckling thereof while ensuring that the friction process is properly performed.

Furthermore, one or more embodiments of the present invention make it possible to provide a friction welding apparatus that is capable of performing such a friction welding method.

BRIEF DESCRIPTION OF DRAWINGS

Many aspects of the invention can be better understood with reference to the attached drawings. The components in the drawings are not necessarily to scale, emphasis instead being placed upon clearly illustrating the principles of the present invention. Moreover, in the drawings, like reference numerals designate corresponding parts throughout the several views.

FIG. 6 is a table containing numeric results of testing carried out in accordance with the exemplary method described with reference to FIG. 5.

FIG. 7 is a table containing results of qualitative evaluation of the numeric test results presented in the table of FIG. 6.

Figure 1:
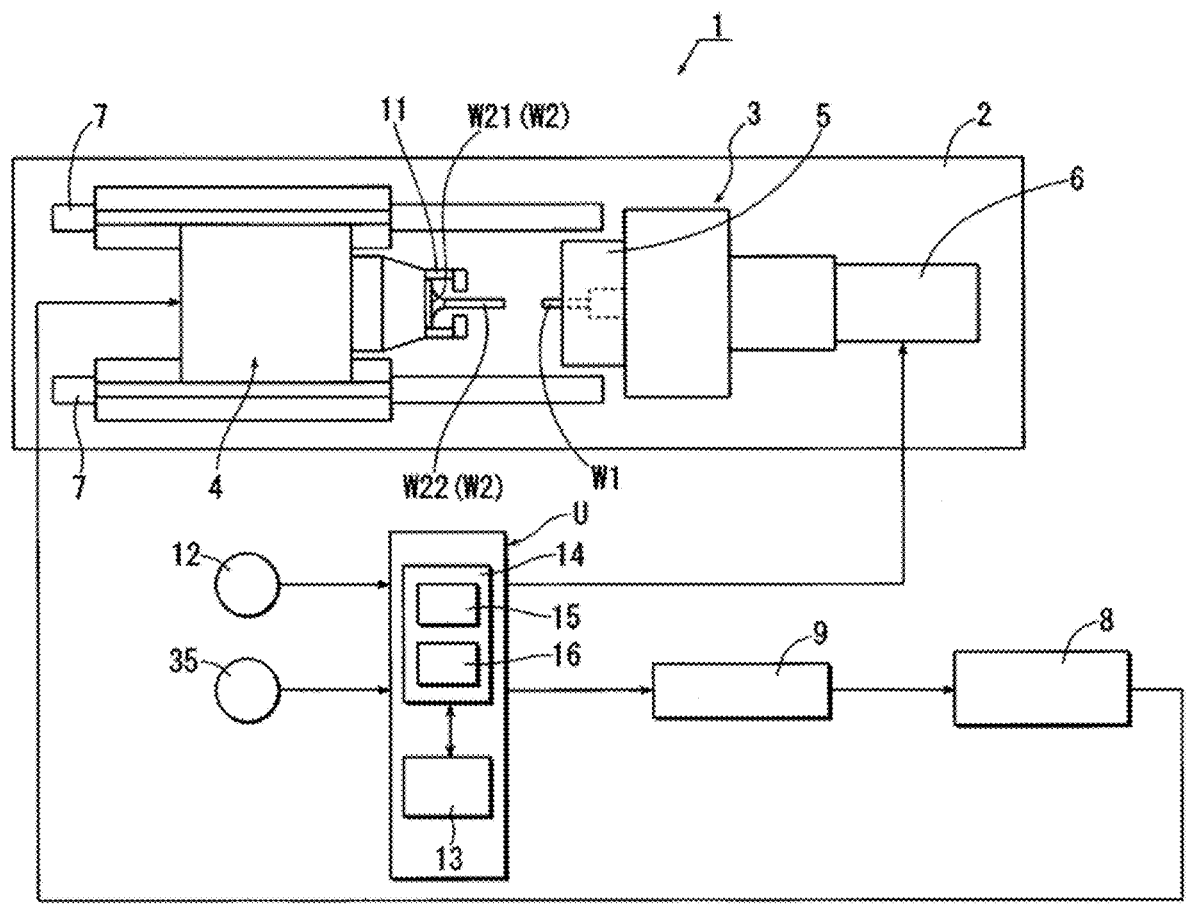
FIG. 1 is an overall configuration diagram of a friction welding apparatus in accordance with an embodiment of the present invention.

At the graphs shown in FIGS. 2, 4, 10, 11, 12, and 15, note that the horizontal axis is time, while the vertical axis is either rotational speed or axial compressive load (pressure) as indicated on the respective curves shown in the drawings.

DETAILED DESCRIPTION

Although embodiments of the present invention are described in terms of the example of a valve in which a friction-weld joint is employed to join a head member and a stem member of an engine valve, the present invention is not limited to friction-weld engine valves but may be applied to friction-weld parts in general.

Furthermore, in the context of examples described herein in which the present invention is applied to formation of a joint between a head member and a stem member of an engine valve, although the stem member has for convenience of description been chosen to serve as first workpiece W1, and the valve head has for convenience of description been chosen to serve as second workpiece W2, there is no limitation with respect thereto, it being possible, for example, to apply embodiments of the present invention to situations in which a stem-like member is made to serve as the second workpiece W2, and a head-like member is made to serve as the first workpiece W1.

Furthermore, although the examples presented herein generally envision formation of a single friction-weld joint between two workpieces W1, W2, there is no particular limitation with respect thereto, it being in general possible to employ methods and apparatuses in accordance with embodiments of the present invention to form any number of friction-weld joints between or among any number of workpieces.

Moreover, the present invention is not limited to formation of friction-weld joint(s) between stem-like member(s) and head-like member(s), it being possible to apply the present invention to formation of friction-weld joint(s) between any collection of part(s) having end surface(s) capable of being abutted in such fashion that formation of friction-weld joint(s) therebetween is possible.

Embodiments of the present invention are described below with reference to the drawings.

A friction welding method in accordance with one embodiment of the present invention includes sequentially performing a friction process during which end surfaces of two workpieces are made to engage in relative rotation while the ends are pressed together so as to cause a friction-producing compressive load to act therebetween (state in which friction-producing pressure is applied) to generate heat due to friction at a joint interface, and an upset process during which the relative rotation between the workpieces is stopped and an upset-producing compressive load is made to act therebetween. In accordance with the present embodiment, the friction process may include not only a main friction process but also a preliminary friction process. Before providing further description of this and other embodiments of the friction welding method of the present invention, a friction welding apparatus capable of performing such friction welding methods in accordance with embodiments of the present invention will be described.

Referring to FIG. 1, a friction welding apparatus 1 is capable of integrally joining two workpieces W1, W2 by friction welding.

In one embodiment, a valve shaft or other such shaft-like member serves as first workpiece W1, and a valve head or other such oblate member might be envisioned as serving as second workpiece W2. For example, a shaft member serving as first workpiece W1 may be formed in a generally shaft-like shape (e.g., of circular cross section 6 mm in diameter), and the a head member serving as second workpiece W2 might integrally have a valve body portion W21 and a shaft portion W22 (e.g., of circular cross section 6 mm in diameter) extending from the valve body portion W21. That is, following friction welding by apparatus 1, first workpiece W1 and second workpiece W2 might be in a relationship in which the shaft portion W22 of the head member W2 and the shaft member W1 are joined in integral fashion to constitute an engine valve.

In accordance with one embodiment, the workpiece W1 and the workpiece W2 might be made of different materials. Specifically, SUH11 might be used for the workpiece W1 (shaft member), and SUH35 might be used for the workpiece W2 (head member).

As shown in FIG. 1, the friction welding apparatus 1 includes a spindle device 3 and a slider device 4 arranged adjacent to each other as a pair of holding devices on an elongated support base 2 extending in one direction.

The spindle device 3 is fixed to an upper surface of the support base 2 on one side (the right side in FIG. 1) in the long direction thereof. The spindle device 3 includes a spindle chuck unit 5 chucking (holding) a portion of the shaft member serving as first workpiece W1 on the inner side in the long direction of the support base 2, the chuck unit 5 being rotationally driven by a rotary drive unit 6 serving as a rotary drive source which may be included in the spindle device 3.

The slider device 4 is arranged on the upper surface of the support base 2 on the other side (the left side in FIG. 1) in the long direction thereof. The slider device 4 is associated with a pair of guide rails 7, a suitable ball screw mechanism 8, and a drive motor 9 serving as a movement drive source for operating the ball screw mechanism 8, the slider device 4 being thereby movable toward and away from the spindle device 3.

The slider device 4 includes a slider chuck unit 11 on the inner side in the long direction of the support base 2. The chuck unit 11 chucks (holds) the shaft portion W22 of the head member serving as second workpiece W2 in such fashion that when the shaft portion W22 is chucked by the chuck unit 11, the shaft portion W22 extends in a direction away from the chuck unit 11 relative to the valve body portion W21, so that an end surface of the shaft portion W22 can be made to move closer to and farther away from an end surface of the shaft member W1 held by the spindle device 3 in accompaniment to sliding actuation of the slider device 4.

As shown in FIG. 1, the friction welding apparatus 1 includes a control unit (control means, control device) U for controlling the rotary drive unit 6 of the spindle device 3 and the drive motor 9 of the slider apparatus 4.

The control unit U receives input of various signals from a pressure sensor (compressive load detecting unit) 12 which detects the pressure acting between the first and second workpieces W1, W2 and a rotational speed detection sensor 35 which detects the rotational speed of the rotary drive unit (rotary drive source) 6 of the spindle device 3, the control unit U respectively outputting control signals to the rotary drive unit 6 of the spindle device 3 and the drive motor 9 of the slider device 4. The control unit U has a built-in timer circuit fulfilling a timer function.

As shown in FIG. 1, the control unit U includes a storage unit 13 and a controller 14 permitting it to function as a computer.

The storage unit 13 is made up of storage elements such as a ROM (read only memory) and a RAM (random access memory), and the storage unit 13 stores various programs necessary for friction welding between workpieces, and setting information such as a slide speed of the slider device 4, a first rotational speed and a second rotational speed (steady-state rotational speed) of the rotary drive unit 6 of the spindle device 3, set times $\Delta t00$, $\Delta t0$, $\Delta t1$, $\Delta t2$ described later, and set pressures P0, P1 described later. These various programs etc. are read out by the controller 14 as needed, and necessary information is appropriately stored in the storage unit 13.

The controller 14 is made up of a CPU (central processing unit), the controller 14 functioning as a setting unit 15 and an arithmetic controller 16 capable of executing programs read from the storage unit 13.

The setting unit 15 sets the time $\Delta t00$ until the rotational speed of the rotary drive unit 6 of the spindle device 3 reaches the first rotational speed (steady-state rotational speed), the first rotational speed (steady-state rotational speed) and the second rotational speed (steady-state rotational speed) which is larger than the first rotational speed of the rotary drive unit 6 of the spindle device 3, the preliminary friction process pressure (compressive load) P0 and the preliminary friction process time $\Delta t0$ employed during the preliminary friction process, the main friction process pressure (compressive load) P1 and the main friction process time $\Delta t1$ employed during the main friction process, the upset process pressure (compressive load) P2 and the upset process time $\Delta t2$ employed during the upset process, etc. (see FIG. 4).

The arithmetic controller 16 executes arithmetic processing in accordance with various programs based on the setting information at the setting unit 15 and the input information from the sensors 12, 35 and outputs various control signals to the rotary drive unit 6 of the spindle device 3 and the drive motor 9 of the slider device 4.

Friction welding control by the control unit U causes friction welding methods in accordance with embodiments of the present invention to be performed.

Basic Friction Welding Control

Figure 2:
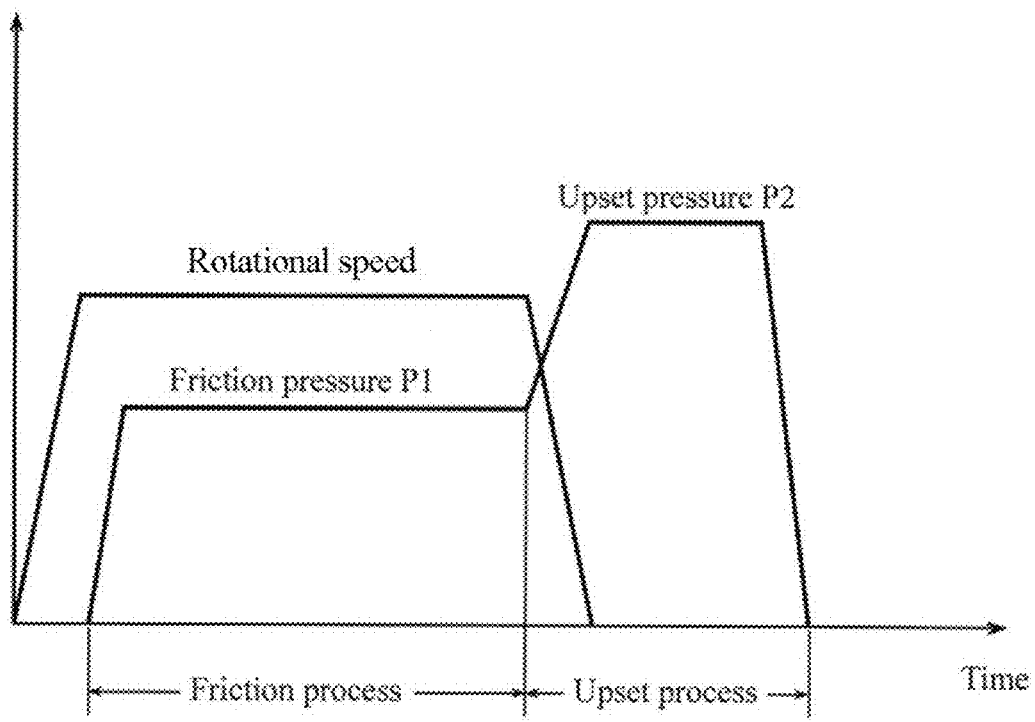
FIG. 2 is an explanatory diagram for explaining control such as may be carried out by a control unit implementing a friction welding method in accordance with an embodiment of the present invention.
Figure 3:
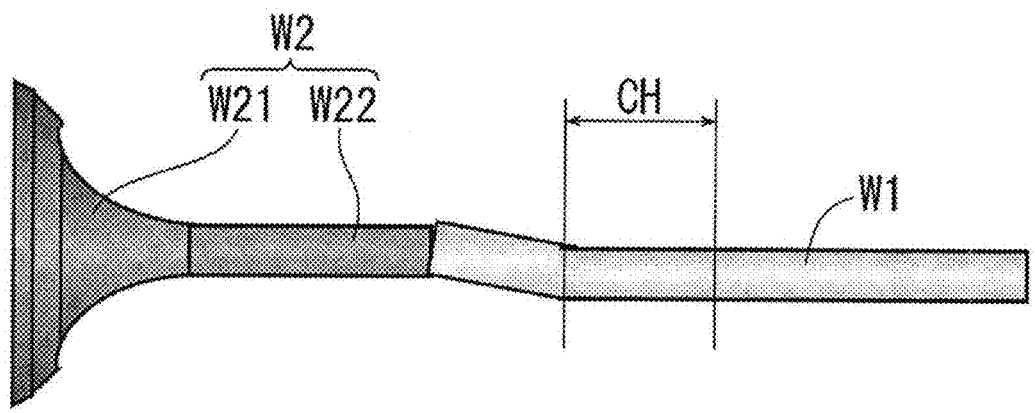
FIG. 3 is a view of a situation in which a workpiece is bent and/or buckled.

Referring to FIG. 2, basic friction welding control in accordance with one embodiment of the present invention includes sequentially performing a friction process of relatively rotating an end surface of the workpiece W1 chucked by the spindle device 3 and an end surface of the workpiece W2 chucked by the slider device 4 (at the constant rotational speed; in this embodiment, only workpiece W1 is made to rotate about its axis) while the end surfaces are pressed against each other at friction-producing pressure P1 so as to generate heat due to friction at a joint interface between the workpieces W1, W2, and an upset process of stopping the relative rotation between the workpieces W1, W2 and then pressing the workpieces W1, W2 against each other at upset-producing pressure P2 which is greater than friction-producing pressure P1. During the friction-producing process produced by this basic friction welding control, the friction-producing pressure P1 and the relative rotational speed of the workpieces W1, W2 are each kept substantially constant during the entire process.

Friction Welding Control for Implementing Preliminary Friction Process

Figures 4, 5:
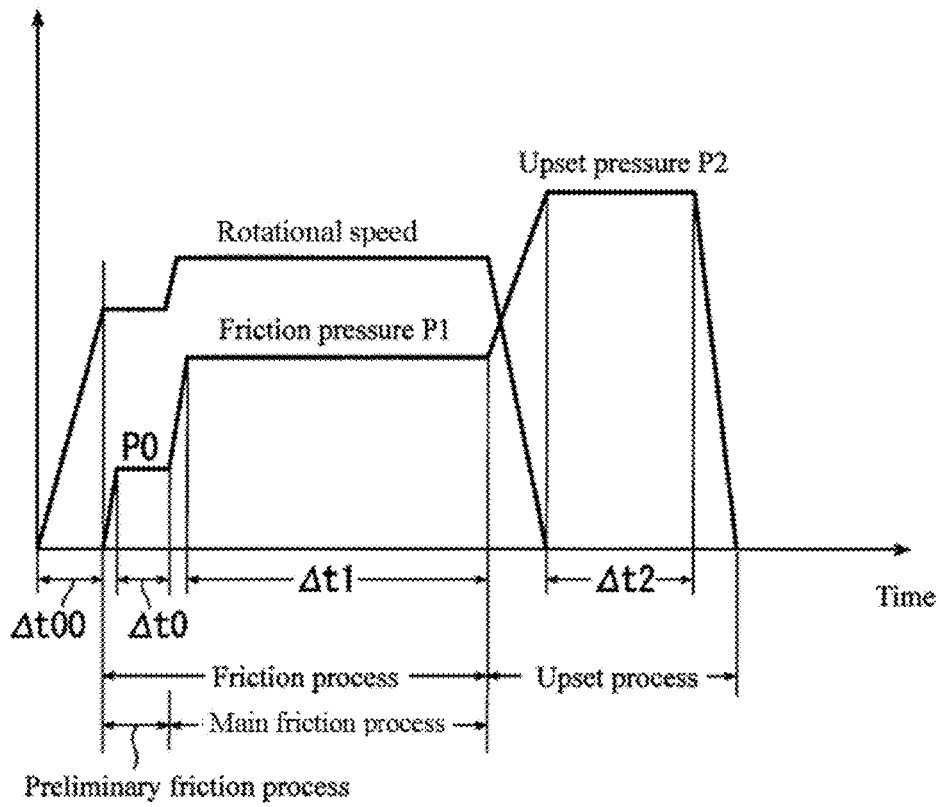
FIG. 4 is an explanatory diagram for explaining control such as may be carried out by a control unit implementing a friction welding method in accordance with another embodiment of the present invention.
FIG. 5 is a table illustrating an exemplary method for determining appropriate conditions to be employed at a preliminary friction process incorporated in a friction process in accordance with an embodiment of the present invention.

Referring to FIG. 4, during friction welding control in accordance with a preferred embodiment of the present invention, the friction process is divided into a main friction process and a preliminary friction process which is incorporated into the friction process before the main friction process, the main friction process being in this embodiment substantially as described above with reference to basic friction welding control.

The preliminary friction process is employed in consideration of the phenomena described above; i.e., it is thought that the shaft member W1 is joined in a bent manner to the shaft portion W22 of the head member W2 at the time of contact between the members W1, W2, at which the end surface shapes of the members W1, W2 have the most significant influence.

In accordance with the preliminary friction process of the present embodiment, a preliminary friction process pressure P0 which is lower than a main friction process pressure P1 is used, and the shaft member W1 is rotated at a rotational speed which is lower than the rotational speed employed during the main friction process to adapt the end surfaces of the head member W2 and the shaft member W1 to each other before entering the main friction process.

However, as can be seen from the exemplary test results presented at FIGS. 5 to 7 for determining appropriate conditions to be employed at the preliminary friction process, reliable improvement is not necessarily obtained despite the incorporation of a preliminary friction process unless the appropriate conditions are employed during that preliminary friction process.

FIG. 5 is a table illustrating an exemplary method for determining appropriate conditions to be employed at a preliminary friction process incorporated in a friction process in accordance with an embodiment of the present invention.

At the table shown in FIG. 5, rotational speed (main shaft rotational speed) (rpm) represents the rotational speed of the chuck unit 5 rotated by the rotary drive unit 6 of the spindle device 3, and the word "load" at "P0 (load)" indicates that a load (kN) was measured during testing instead of pressure P0 (MPa), this being the axial compressive load applied to the composite structure obtained when the end surface of the shaft portion W22 of the head member W2 was made to abut the end surface of the shaft member W1. Except where otherwise indicated, testing to produce the tables shown in FIGS. 5 to 7 employed the exemplary test conditions listed below, testing being conducted using substantially identical sets of workpieces W1, W2, rotational speed (rpm) and P0 (load) being varied during the preliminary friction process as indicated at conditions No. 1 to No. 20 shown in FIG. 5, the conditions under which the main friction process and the upset process were thereafter performed not being varied but being in all cases as listed at the following exemplary test conditions.

Exemplary Test Conditions

Workpiece W1: shaft member (made of SUH11), 6 mm in diameter, protruding 16 mm from the chuck unit 5

Workpiece W2: head member (made of SUH35), 6 mm in diameter at shaft portion of head member, protruding 11 mm from the chuck unit 11

Preliminary friction process: preliminary friction process time of 0.5 sec

Main friction process: main friction process pressure P1 (load) (note that load was measured instead of pressure; hereinafter referred to as P1 (load)) of 6.5 kN, main friction process time of 0.78 sec, rotational speed of 3600 rpm Upset process: upset process pressure P2 (load) (note that load was measured instead of pressure; hereinafter referred to as P2 (load)) of 11.3 kN, upset process time of 0.31 sec, P2L (delay time from rotation stop instruction to chuck unit 5 until transition to P2) of 0.05 sec FIG. 6 is a table containing numeric results of testing carried out in accordance with the exemplary method described with reference to FIG. 5. Specifically, the table in FIG. 6 shows the results of measurement of bending of shaft member W1 with respect to the shaft portion W22 of head member W2 after joining of head member W2 and shaft member W1 under the conditions listed at No. 1 to No. 20 in FIG. 5.

Figure 8:
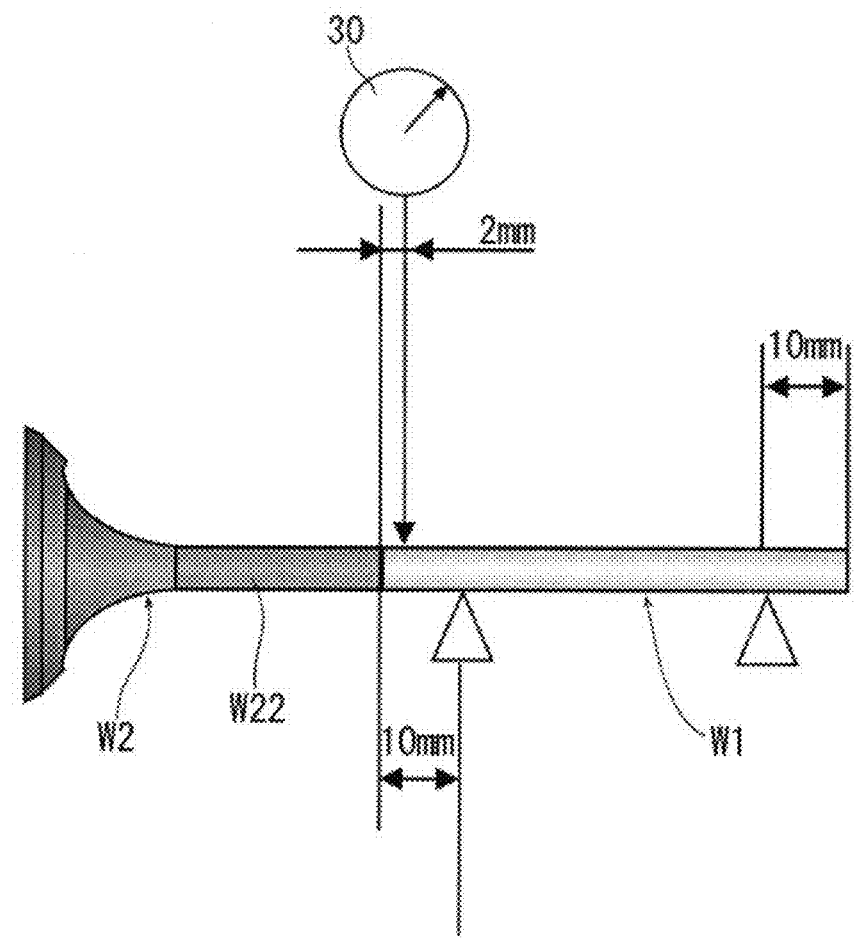
FIG. 8 is an explanatory diagram for explaining an exemplary measuring method which may be used to obtain numeric results such as those shown in the table of FIG. 6.

Here, referring now to FIG. 8, to measure the bending of shaft member W1 with respect to shaft portion W22 of head member W2, the composite object (object to be measured) obtained by joining the head member W2 and the shaft member W1 was placed in a runout measuring device and made to rotate about its center line to measure a delta (difference) value as compared with the original diameter of the shaft member W1 relative to that center line with a measurement tool 30 at a position of 2 mm from the joint interface between the head member W2 and the shaft member W1, and a maximum value and a minimum value were obtained for a (½) value of the delta value. In FIG. 6, MAX is the maximum value, MIN is the minimum value, and AVG is the average value of the measurements obtained for all runs under each set of test conditions, R being the difference between the maximum value and the minimum value. Test No. B/M of FIG. 6 shows results obtained using the basic friction welding control shown in FIG. 2.

FIG. 7 is a table containing results of qualitative evaluation of the numeric test results presented in the table of FIG. 6. In FIG. 7, gray-colored results are favorable results substantially without bending, and in this evaluation, the results having a value of 0.1 mm or less as the average value (AVG) shown in FIG. 6 was judged as the favorable results substantially without bending.

According to FIG. 7, when the rotational speed was 1250 rpm or more and P0 (load) was in the range of 1.0 kN to 2.0 kN, favorable results were obtained, and when P0 (load) was 4 kN or more or was 0.5 kN or less, no favorable result was obtained regardless of rotational speed. When the rotational speed was 1000 rpm or less, no favorable result was obtained regardless of P0 (load).

Friction Welding Control to Avoid Bending/Buckling

Based on the results of evaluation as described above, the present inventor concludes as follows.

(1) When the end surface of a first workpiece (shaft member) W1 comes into contact with the end surface of a second workpiece (head member) W2, the first workpiece W1 and/or the second workpiece W2 will bend and/or buckle if the end surfaces of the workpieces W1, W2 are pressed against each other by a predetermined compressive load or more.

That is, according to the evaluation results of the test, it was found that the bending phenomenon always occurred regardless of rotational speed if P0 (load) was 4 kN or more, suggesting the presence of a lower threshold in terms of a bend-producing compressive load domain that would cause bending of the first workpiece W1 and/or the second workpiece W2 (bending of the first workpiece W1 with respect to the second workpiece W2 being measured during the present testing but the present conclusion more generally applying to bending/buckling of either or both workpiece(s)). It is also noted that while the compressive load and the end surface states of the workpieces W1, W2 are considered as factors capable of causing bending of the first workpiece W1 and/or the second workpiece W2, it is thought that the degree of the end surface state(s) of the workpiece W1 (W2) does not significantly differ and that whether the bending phenomenon occurs depending on a value of the compressive load.

Figure 9:
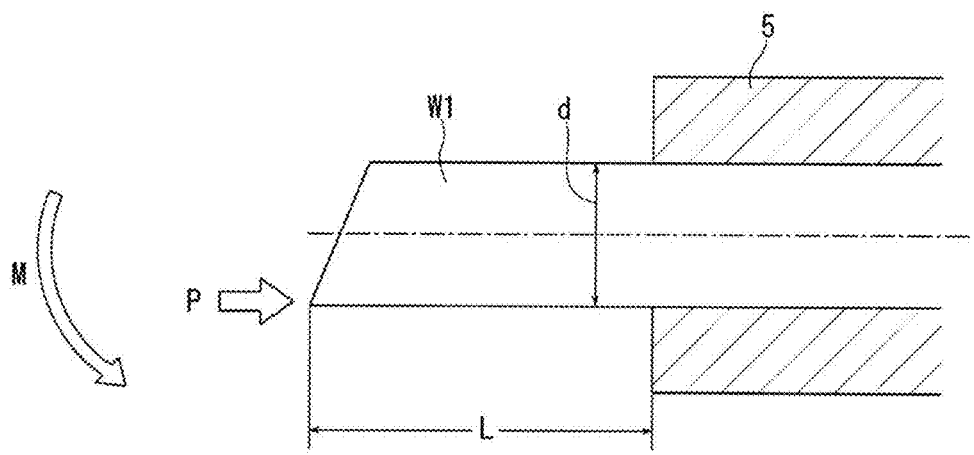
FIG. 9 is an explanatory diagram for explaining how a bending moment may cause bending and/or buckling of a first workpiece and/or a second workpiece.

On the other hand, the present inventor thinks that when the end surface of a first workpiece (shaft member) W1 is brought into contact with the end surface of the second workpiece (head member) W2, a compressive stress acts on the workpiece W1 (W2) while a stress due to a bending moment acts thereon as shown in FIG. 9 and thinks that this affects the occurrence of the bending phenomenon when the workpieces W1, W2 are in contact with each other. Therefore, a trial calculation of a bending generating load Py was attempted for the workpiece W1 (SUH11) tending to easily bend with respect to the workpiece W2. The calculation can be represented by the following equation. In FIG. 9, reference numeral L denotes the protruding length of workpiece W1, i.e., the length by which workpiece W1 extends or protrudes beyond the end of chuck unit 5.

$\sigma$(total stress) =

$P/A$(compressive stress) + $M/Z$(stress due to bending moment) =

$$(P/(\pi d^2/4)) + P(d/2)/(\pi d^3/32)$$

where P is load (N), d is workpiece diameter (mm), $A=\pi d^2/4$ is workpiece cross-sectional area (mm$^2$), $M=P(d/2)$ is bending moment (N·mm), and $Z=\pi d^3/32$ is the section modulus for a circular cross section.

The foregoing equation may be rearranged as follows:

$$P = \sigma/(1/(\pi d^2/4) + (d/2)/(\pi d^3/32)) = \sigma \pi d^2/20. \quad (A)$$

By substituting proof stress $\sigma y=685$ (N/mm$^2$) of the workpiece (SUH11) and diameter d=6 (mm) of the workpiece (SUH11) in FORMULA (A), the bending load Py of the workpiece (SUH11) is given by:

$Py=3.87$ (kN).

This value is close to the test result (P0 (load)=4.0 (kN)) in which the bending phenomenon always occurs when the end surfaces of the workpieces W1, W2 are brought into contact with each other, and it is considered that the bending moment affects the bending phenomenon when the end surfaces of the workpieces W1, W2 are brought into contact with each other and that this bending moment leads to a lower threshold Pbl of the bend-producing compressive load domain.

Figure 10:
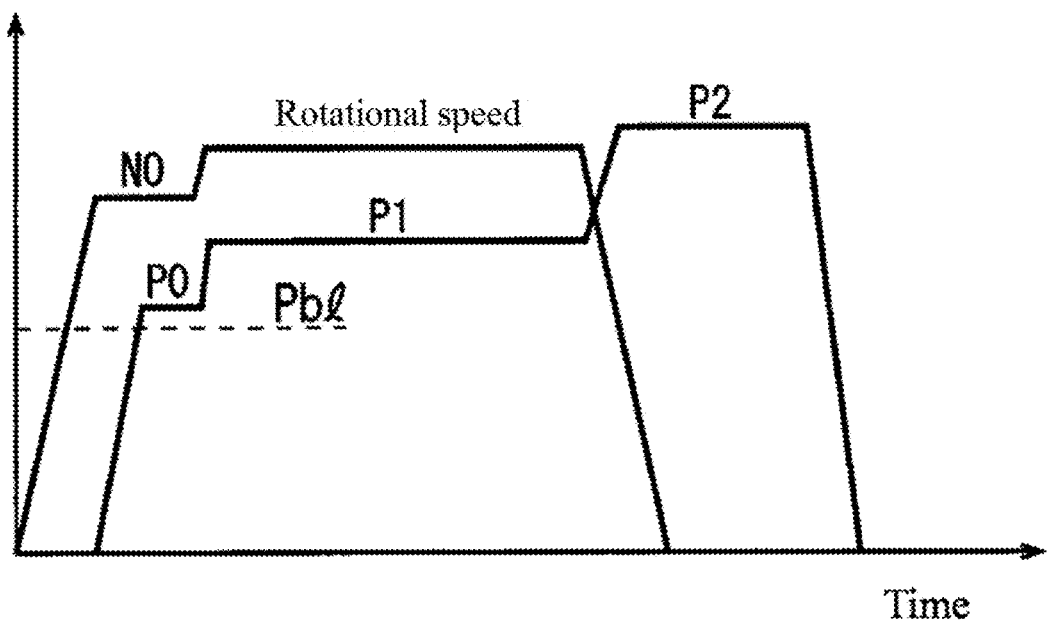
FIG. 10 is an explanatory diagram for explaining the situation that exists when P0 (load) serving as axial compressive load exceeds a lower threshold Pbl of a bend-producing compressive load domain.

Therefore, it is considered that in the test results described above, the bending phenomenon occurs in the workpieces W1, W2 at P0 (load)=4.0 (kN) or more because P0 (load) becomes greater than or equal to a lower threshold Pbl of a bend-producing load domain (bend-producing compressive load domain) within which bend-producing will occur when the workpieces W1, W2 are brought into contact with each other as shown in FIG. 10.

(2) When the end surface of a first workpiece W1 is brought into contact with the end surface of a second workpiece W2, the first workpiece W1 and/or the second workpiece W2 will bend and/or buckle if the heat due to friction causes no plastic deformation even though the heat due to friction occurs between the workpieces W1, W2.

From the results of the testing described above, the first workpiece W1 was bent with respect to the second workpiece W2 at rotational speeds of 1000 rpm or less when P0 (load) was in the range of 1.0 kN to 2.0 kN, while the first workpiece W1 was bent with respect to the second workpiece W2 at P0 (loads) less than 0.5 kN when rotational speed was in the range up to 3000 rpm, a conceivable reason for which being that at such rotational speeds and P0 (loads) in the preliminary friction process, the preliminary frictional heat generated therefrom causes no plastic deformation between the workpieces W1, W2 and allows transition to the main friction process to occur while the end surface state(s) of the workpiece W1 (W2) is still in its uncorrected initial state(s), which causes the workpieces W1, W2 to receive P1 (load) that exceeds the lower threshold (compressive load) Pbl (4 kN) for causing occurrence of the bending phenomenon.

Figure 11:
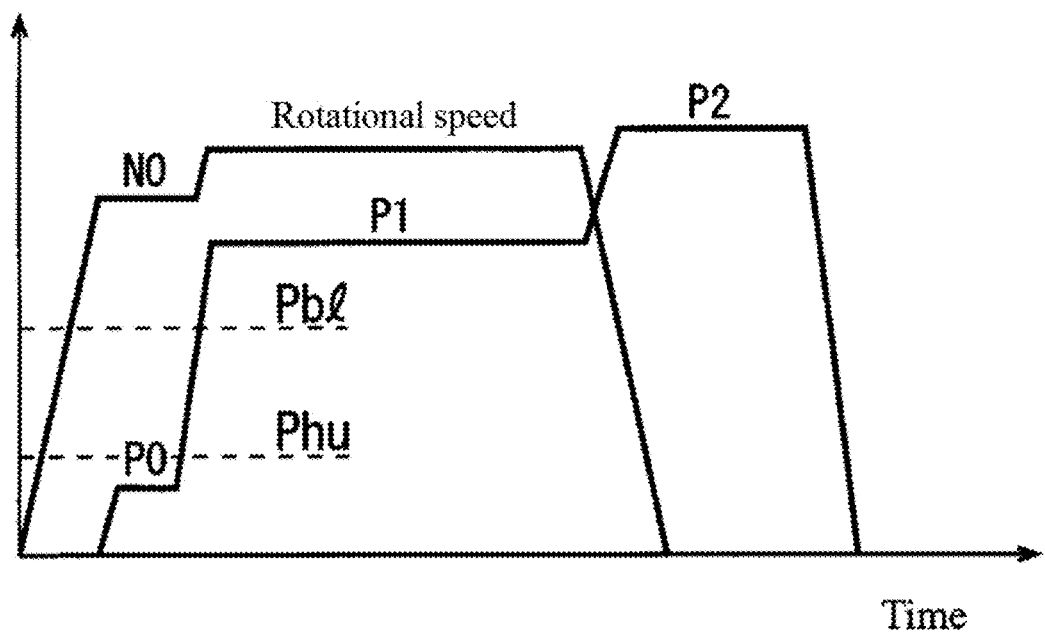
FIG. 11 is an explanatory diagram for explaining the situation that exists when P0 (load) serving as axial compressive load is less than or equal to the upper limit (load) Phu of a non-plastically-deforming compressive load domain within which heat due to friction capable of causing plastic deformation is not generated for a given rotational speed N0.

Detailed description is now given with reference to FIG. 11. To generate the preliminary frictional heat causing plastic deformation at the workpieces W1, W2 in the preliminary friction process, when the rotational speed is N0, P0 (load) must exceed the upper limit Phu of the non-plastically-deforming compressive load domain within which the preliminary frictional heat capable of causing plastic deformation is not generated at the rotational speed N0 (e.g., P0 (load)=0.5 kN at N0=3000 rpm). This is because if P0 (load) is less than or equal to the upper limit Phu of the non-plastically-deforming compressive load domain at rotational speed N0 (e.g., P0 (load)=0.4 kN at N0=3000 rpm), the preliminary frictional heat will fail to cause plastic deformation between the workpieces W1, W2, as a result of which the transition to the main friction process will occur with the workpiece W1 (W2) still in its uncorrected initial end surface state(s). And if workpieces W1 and W2 should receive P1 (load) exceeding the lower threshold Pbl (4 kN in the present example) for causing occurrence of the bending phenomenon while in their uncorrected initial end surface states, this is believed to be what causes occurrence of bending/buckling at workpieces W1, W2.

Note that if the rotational speed N0 changes, because the upper limit Phu of the non-plastically-deforming compressive load domain will also change accordingly, to cause occurrence of plastic deformation, P0 (load) should exceed the revised upper limit Phu of the revised non-plastically-deforming compressive load domain that corresponds to the new rotational speed N0. This is because the preliminary frictional heat required to cause plastic deformation is constant but this preliminary frictional heat is determined by the rotational speed and the compressive load (P0 (load)).

The details described above can be confirmed by calculating the heat due to friction based on the test conditions shown in FIG. 7. This will now be described in detail.

Heat Q due to friction generated between the workpieces W1, W2 is proportional to P0 (load) and the rotational speed N0 when the friction-producing time is constant, and the heat Q due to friction can be expressed by the following equation:

$$Q = k \times P0(\text{load}) \times N0,$$

where k is a constant.

When the heat Q due to friction is calculated based on this equation, the conditions showing favorable results in FIG. 7 yield a Q of 1500×k (1500×k to 7200×k) even at the minimum value, while the conditions not showing favorable results in FIG. 7 yield a Q of 2000×k (750×k to 2000×k) even at the maximum value. From this fact, a tendency can be seen that the heat Q due to friction is insufficient in those not showing favorable results in FIG. 7 as compared to those showing favorable results in FIG. 7, and it is considered, as shown in FIG. 11, that the workpieces W1, W2 make the transition to the main friction process without correction to end surface irregularities of the workpieces having been made at the preliminary friction process.

Preferred Friction Welding Control by Control Unit U

Figure 12:
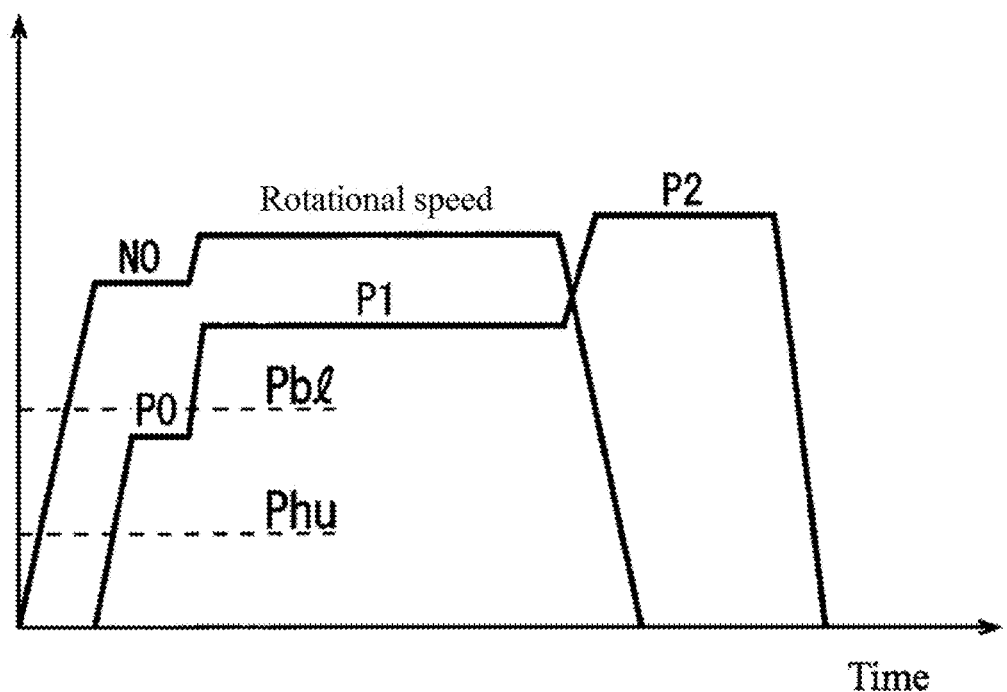
FIG. 12 is an explanatory diagram for explaining a situation in which, in accordance with an embodiment of the present invention, P0 (load) might be made to be in a region (range of compressive loads) within which P0 (load) is less than the lower threshold Pbl of the bend-producing compressive load domain but high enough to be in a plastically-deforming compressive load domain within which heat due to friction capable of causing plastic deformation is generated.

Based on the conclusions of the present inventor as described at (1) and (2), above, during friction welding control by control unit U in accordance with a preferred embodiment of the present invention, as shown in FIGS. 4 and 12, a preliminary friction process is incorporated into the friction process in addition to the main friction process.

During this preliminary friction process, the pressure used as the preliminary friction process pressure P0 (compressive load) is preferably less than the lower threshold Pbl of the bend-producing compressive load domain that would cause bending of the first workpiece W1 and/or the second workpiece W2, but the preliminary friction process pressure P0 and the rotational speed of the workpiece W1 are chosen so that the heat due to friction causes occurrence of plastic deformation between the end surfaces of the workpieces W1, W2.

Therefore, under the exemplary test conditions described above, when setting the load to be used as the compressive load, P0 (load) is set to a predetermined value (e.g., 2 kN) in a range greater than 0.5 kN and less than 4 kN when the rotational speed of the workpiece W1 is 1250 rpm or more (e.g., 3000 rpm).

Figure 13:
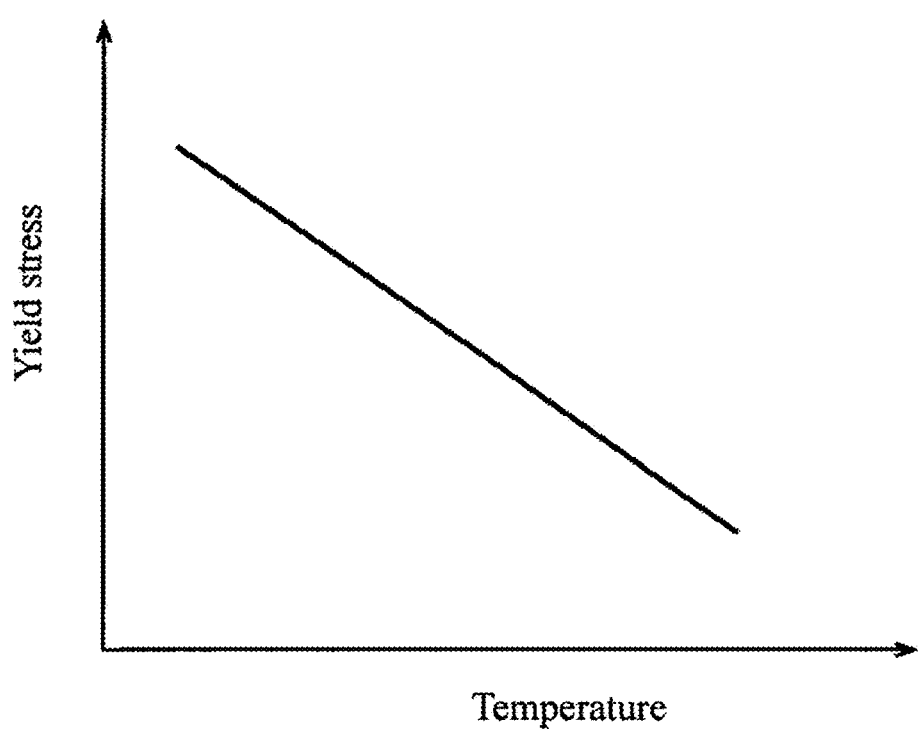
FIG. 13 is a diagram showing an exemplary characteristic relationship between temperature and the yield stress of an exemplary workpiece.

In a preferred embodiment, the preliminary friction process pressure P0 is made to be as close as possible to the lower threshold Pbl (e.g., corresponding to a load of 4 kN in the case of the exemplary test conditions described above) of the bend-producing compressive load domain that would cause bending of the first workpiece W1 and/or the second workpiece W2 without actually reaching that lower threshold Pbl. For example, the preliminary friction process pressure P0 might in some embodiments be made to be closer to the lower threshold Pbl of the compressive load domain than the preliminary friction process pressure P0 is to the upper limit Phu of the non-plastically-deforming compressive load domain that must be exceeded to generate the appropriate amount of heat due to friction; i.e., in some embodiments, (Pbl−P0)<(Phu−P0). This is because it may in some embodiments be possible to cause the end surfaces of the workpieces to be quickly plastically deformed by utilizing the fact that when yield stress is higher, the temperature for achieving the yield stress becomes lower as shown in FIG. 13. This will make it possible for the process by which end surface irregularities of the workpieces are corrected to be carried out quickly.

Figure 14:
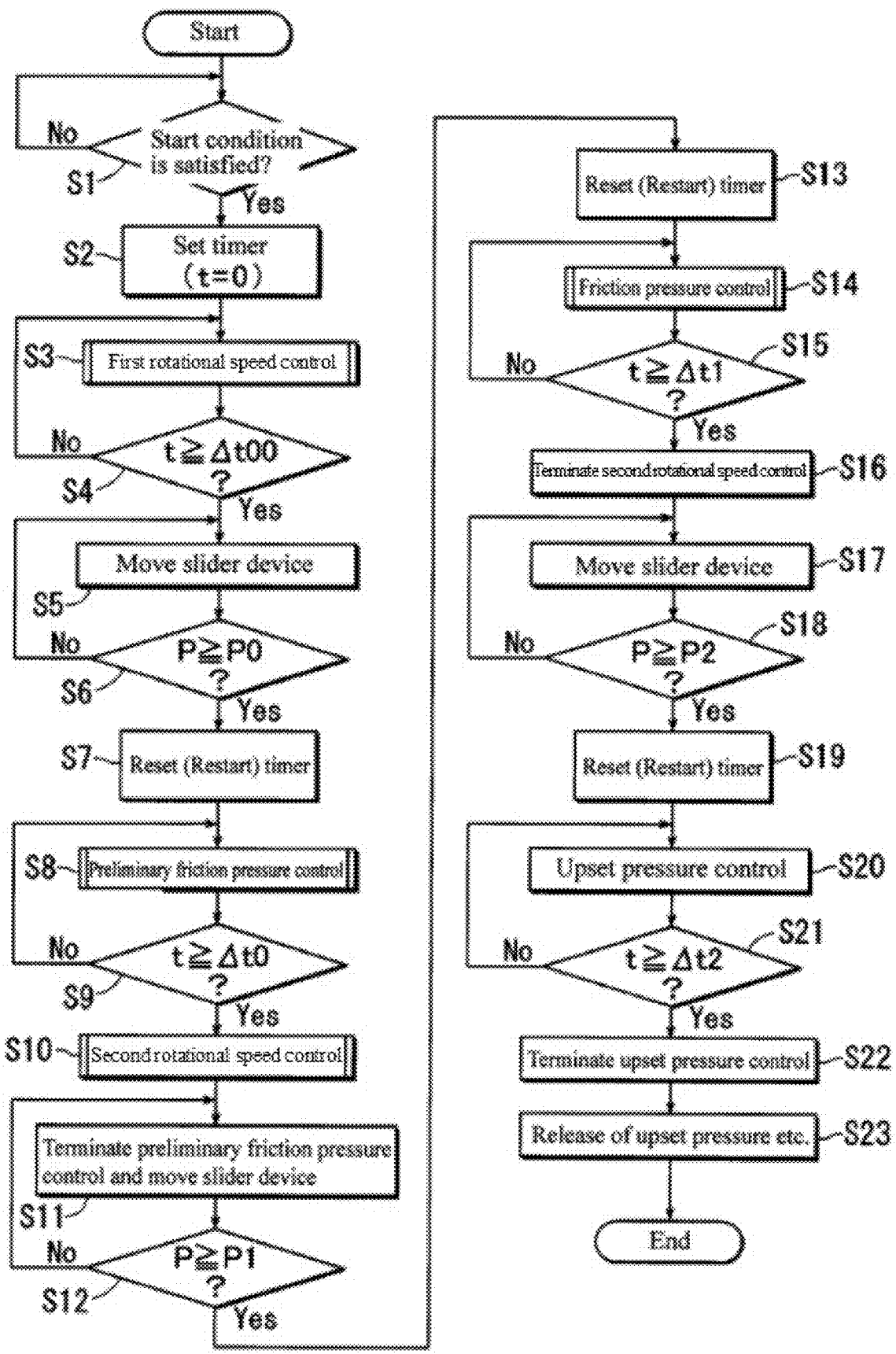
FIG. 14 is a flowchart showing flow of processing during control such as might be carried out by control unit implementing a friction welding method according to an embodiment of the present invention.

Referring to the flowchart shown in FIG. 14, exemplary such as may be carried out by control unit U in the context of operations such as are schematically illustrated in the explanatory diagrams shown in FIGS. 4 and 12 will now be described. Note that the letter "S" in FIG. 14 denotes a step. It is assumed that various pieces of information such as setting information have been loaded and/or set in advance.

When the workpieces W1, W2 are held by the spindle device 3 and the slider device 4 and a control start condition is satisfied, a timer is set, and the rotary drive unit 6 of the spindle device 3 is driven toward the first rotational speed (e.g., 3000 rpm (steady-state rotational speed) in the case of the exemplary test conditions described above) (S1 to S3).

After the timer is set (S2) and the set time Δt00 has elapsed, the slider device 4 starts moving (S4, S5) so as to bring the end surfaces of the workpieces W1, W2 into contact with each other, and evaluation is carried out at S6 to determine whether the pressure (compressive load) being applied is greater than or equal to the preliminary friction process pressure P0. This is so that the end surfaces of the workpieces W1, W2 will be brought into contact with each other at the preliminary friction process pressure P0 to generate the heat due to friction between the end surfaces of the workpieces W1, W2 (preliminary friction process pressure control). In accordance with the present embodiment, a pressure (e.g., 2.0 kN) employed as the preliminary friction process pressure P0 is less than the lower threshold Pbl of the bend-producing compressive load domain that would cause bending of the first workpiece W1 and/or the second workpiece W2 (e.g., corresponding to a load of 4 kN in the case of the exemplary test conditions described above), but the preliminary friction process pressure P0 and the first rotational speed cause generation of heat due to friction that causes the end surfaces of the workpieces W1, W2 to be in a plastically deformed state. The reason for this is so as to cause the bending phenomenon to be prevented from occurring in the workpieces W1, W2 by using a preliminary friction process pressure P0 that is less than the lower threshold Pbl of the bend-producing compressive load domain when the workpieces W1, W2 are brought into contact with each other, and so as to cause any end surface irregularities of the workpieces W1, W2 to be corrected by this plastic deformation so as to prevent the bending phenomenon from occurring in the workpieces W1, W2 even when pressing is subsequently performed at the main friction process pressure P1.

Therefore, if the result of the evaluation at S6 is NO, the movement of the slider device 4 is continued to increase the compressive load acting between the workpieces W1, W2, and if the result of the evaluation at S6 is YES, the timer is reset to start counting a time during which preliminary friction process pressure control is maintained (S7, S8). During preliminary friction process pressure control, the compressive load P is maintained at the preliminary friction process pressure P0 through movement control of the slider device 4, and the heat due to friction is generated between the end surfaces of the workpieces W1, W2 for the predetermined time Δt0 while at the preliminary friction process pressure P0, (S8, S9).

When the predetermined time Δt0 has elapsed from the restart of the timer at S7, the rotational speed of the rotary drive unit 6 is changed to a second rotational speed (e.g., 3600 rpm (steady-state rotational speed) in the case of the exemplary test conditions described above), and preliminary friction process pressure control is terminated so that movement of the slider device 4 for the purpose of carrying out main friction process control can be started (S9 to S11). This causes the compressive load (pressure) P between the end surfaces of the workpieces W1, W2 to start increasing toward a load which is typically greater than the preliminary friction process pressure (load) P0.

When the slider device 4 starts to move again (S11), evaluation is carried out at S12 to determine whether the compressive load (pressure) P has reached main friction process pressure P1. This is so that the heat due to friction in the main friction process will be generated between the end surfaces of the workpieces W1, W2 at the main friction process pressure P1. At this point, although the main friction process pressure P1 is greater than the preliminary friction process pressure P0, because any end surface irregularities at the workpieces W1, W2 were corrected by the plastic deformation that was made to take place during the preliminary friction process, the bending phenomenon does not occur in the workpieces W1, W2.

If the result of the evaluation at S12 is NO, the normal movement of the slider device 4 is continued to increase the compressive load (pressure) P, and if the result of the evaluation at S12 is YES, the timer is reset to start counting a time during which main friction process pressure control is maintained (S13, S14). Through this main friction process pressure control, the movement control of the slider device 4 is maintained, and the compressive load P is maintained at the main friction process pressure P1 (e.g., corresponding to a load of 6.5 kN in the case of the exemplary test conditions described above) for the predetermined time Δt1 (S14, S15).

When the main friction process pressure control is maintained for the predetermined time Δt1 (S15), it is determined that the friction process has ended, and a second rotational speed control of the rotary drive unit 6 is terminated at the spindle device 3 so that the rotation of the workpiece W1 based on the rotary drive unit 6 is stopped (S16). Subsequently, at next step S17, the normal movement of the slider device 4 is resumed to increase the compressive load P, and at next step S18, evaluation is carried out to determine whether the compressive load (pressure) P has reached the upset process pressure P2. If the result of the evaluation at S18 is NO, the compressive load P is continued to increase, and if the result of the evaluation at S18 is YES, the timer is reset to start counting a time during which upset process pressure control is maintained (S19, S20). Through this upset process pressure control, the movement control of the slider device 4 is maintained, and the compressive load (pressure) P is maintained at the appropriate upset process pressure P2 (e.g., corresponding to a load of 11.3 kN in the case of the exemplary test conditions described above) for the predetermined time Δt2 (S20, S21).

When the upset process time Δt2 has elapsed from the restart of the timer at S19 (S21), upset process pressure control is terminated (S22). The termination of the upset process pressure control is accompanied by the stop of the pressing between the end surfaces of the workpieces W1, W2 based on the slider device 4 and the release of the upset process pressure, etc. (S23), and the integrally joined workpieces W1, W2 are taken out from the friction welding apparatus 1.

Figure 15:
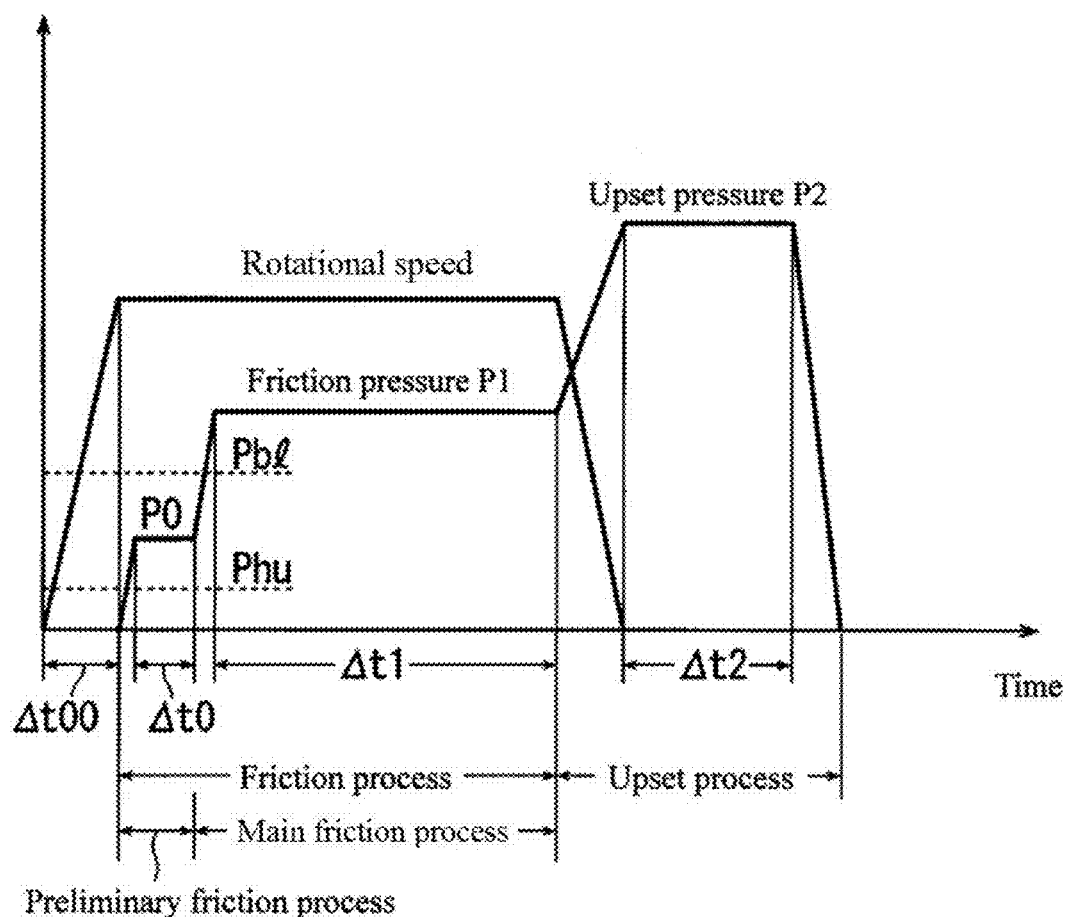
FIG. 15 is an explanatory diagram for explaining control such as might be carried out by a control unit implementing a friction welding method according to yet another embodiment of the present invention.

FIG. 15 shows a variation on the foregoing embodiment in which the preliminary friction process pressure P0 employed at the preliminary friction process is a pressure (P0 (load)=2 kN) that is less than the lower threshold Pbl of the bend-producing compressive load domain, and the rotational speed of the workpiece W1 employed during the preliminary friction process is equal to the rotational speed of the workpiece W1 during the main friction process (e.g., 3600 rpm), such that the rotational speed (at steady-state) during the friction process (including both the preliminary friction process and the main friction process) is made constant. In such case, it is preferred that the rotational speed of workpiece W1 and the preliminary friction process pressure P0 be chosen so as to together cause generation of heat due to friction capable of causing plastic deformation between the end surfaces of the workpieces W1, W2.

Therefore, in accordance with such a variation, not only is it the case that the workpieces W1, W2 can be properly joined to each other without causing bending and/or buckling thereof while ensuring that the friction process is properly performed as was the case at the embodiment described above, but it is also the case that the rotational speed of the workpiece W1 can be set to a single rotational speed (at steady-state) in the friction process (the preliminary friction process and the main friction process), so that rotational speed control can be simplified.

The following further variations on the foregoing embodiments are also possible.

(1) Whereas in the foregoing embodiments, the rotary drive unit 6 was controlled to achieve a set rotational speed (at steady-state) based on detection information from the rotational speed detection sensor 35, it is also possible in a variation for a servo motor to be used as the rotary drive unit 6 such that the rotational state of the servomotor is monitored by an encoder, and if the monitored rotation speed is outside the bounds of the set rotational speed, the servomotor is considered as being in an error state so that rotation thereof is stopped.

(2) The workpieces W1, W2 may be any workpieces of any suitable shape in which the end surfaces thereof are to be integrally joined to each other.

(3) The lower threshold of the bend-producing compressive load domain that would cause bending of workpieces W1, W2 may be appropriately found depending on the cutting machine or other device used to produce the end faces of the workpieces, the end surface diameter of the workpieces, etc.

(4) Each of the workpieces W1, W2 may be rotationally driven relative to support base 2 so as to achieve a state in which the workpieces W1, W2 are rotated relative to each other.

While embodiments of the present invention have been described above, modes of carrying out the present invention are not limited to the foregoing embodiments, a great many further variations being possible without departing from the gist of the present invention. For any of the various function(s) described with reference to the attached drawings, so long as it would not interfere with ability to carry out the function(s) in question, the order of steps may be different from that described herein.

For example, whereas SUH11 was used for workpiece W1, and SUH35 was used for the workpiece W2 in the foregoing embodiments, there is no limitation with respect thereto, it being possible to employ any suitable metal or other material capable of being made to plastically deform as a result of heat due to friction produced by friction welding apparatus 1 at workpiece W1 and at workpiece W2.

Although the present invention has been described in terms of examples employing specific materials for use as workpieces W1, W2 and specific exemplary values for the lower threshold Pbl of a bend-producing compressive load domain and the upper limit (load) Phu of a non-plastically-deforming compressive load domain within which heat due to friction capable of causing plastic deformation is not generated for a given rotational speed N0, it should be noted that the present invention is not limited to the specific exemplary materials and values employed for purposes of illustration above, it being possible to apply the principles of the present invention to workpieces W1, W2 formed from a wide variety of materials which may be friction-welded using any of a wide variety of rotational speeds. Depending on the materials employed at workpieces W1, W2, and on the range of rotational speeds and other conditions available to be employed for friction welding, suitable values should be determined in accordance with the methodology presented by way of illustration above, and those suitable values should be employed as the lower threshold Pbl and the upper limit (load) Phu.

Moreover, the present invention is not limited to formation of friction-weld joint(s) between stem-like member(s) and head-like member(s), it being possible to apply the present invention to formation of friction-weld joint(s) between any collection of part(s) having end surface(s) capable of being abutted in such fashion that formation of friction-weld joint(s) therebetween is possible.

EXPLANATIONS OF REFERENCE NUMERALS

1 Friction welding apparatus
3 Spindle device (holding device)
4 Slider device (holding device)
5 Chuck unit
6 Rotary drive unit (rotary drive source)
9 Drive motor (movement drive source)
12 Pressure sensor (compressive load detecting unit)
P0 Preliminary friction process pressure (compressive load)
P1 Main friction process pressure (compressive load)
P2 Upset process pressure
W1, W2 Workpieces
Pbl Lower threshold of bend-producing compressive load domain
Phu Upper limit of non-plastically-deforming compressive load domain within which heat due to friction capable of causing plastic deformation is not generated
Q Heat due to friction
N0 Rotational speed during preliminary friction process
U Control unit

What is claimed is:

1. A friction welding method programmed in which an end surface of a first workpiece and an end surface of a second workpiece are made to engage in relative rotation while the end surfaces are in mutual contact as a compressive load is applied thereto so as to generate heat due to friction at a joint interface between the workpieces, the relative rotation of the workpieces is thereafter stopped, and an upset process pressure is applied to the workpieces, wherein
   the frictional heat is generated by performing a preliminary friction process started by contact between the end surface of a first workpiece and the end surface of the second workpiece and a main friction process continued from the preliminary friction process, wherein
   in the preliminary friction process, the compressive load employed is less than a lower threshold of a bend-producing compressive load domain that would cause bending of at least one of the first workpiece and the second workpiece but the compressive load and the relative rotation between the workpieces are such as will cause the heat due to friction in the preliminary friction process to be capable of causing plastic deformation at the workpiece end surfaces to correct any irregularities in the workpiece end surfaces so that there will be substantially no bending of the workpieces, and wherein
   the lower threshold of the bend-producing compressive load domain is determined based on the end surface state before contact between the first workpiece and the second workpiece and end surface diameters of the first workpiece and the second workpiece.

2. The friction welding method according to claim 1, wherein
   in the preliminary friction process, when the end surface of the first workpiece and the end surface of the second workpiece are brought into contact with each other, the compressive load employed is closer to the lower threshold of the bend-producing compressive load domain than it is to an upper limit of a non-plastically-deforming compressive load domain within which the heat due to friction capable of causing plastic deformation at the workpiece end surfaces is not generated.

3. The friction welding method according to claim 1, wherein
   after the end surfaces of the workpieces are brought into contact with each other, in the main friction process, the relative rotational speed of the workpieces is made higher than the relative rotational speed at the time of contact between the end surfaces of the workpieces.

4. The friction welding method according to claim 1, wherein after the end surfaces of the workpieces are brought into contact with each other, in the main friction process, the compressive load and the relative rotational speed of the workpieces are made higher than those at the time of contact between the end surfaces of the workpieces to make the heat due to friction higher than the heat due to friction at the time of contact between the end surfaces of the workpieces.

5. The friction welding method according to claim 1, wherein
the relative rotational speed of the workpieces is maintained at constant rotational speed while the heat due to friction is generated.

6. A friction welding apparatus that causes relative rotation of an end surface of a first workpiece and an end surface of a second workpiece while the end surfaces are in mutual contact as a compressive load is applied thereto so as to generate heat due to friction at a joint interface between the workpieces, thereafter causing the relative rotation of the workpieces to stop, and then causing application of an upset process pressure to the workpieces, the friction welding apparatus comprising:
a pair of holding devices each having a chuck unit holding a workpiece and arranged with the chuck parts facing each other;
a movement drive source associated in a drivable manner with at least one of the paired holding devices and moving the workpieces respectively held by the chuck parts of the pair of holding devices in a relatively approaching direction;
a rotary drive source associated in a rotationally drivable manner with at least one of the chuck parts of the pair of holding devices and relatively rotating the workpieces held by the chuck parts;
a compressive load detecting unit detecting a compressive load acting between the end surfaces of the workpieces held by the chuck parts of the pair of holding devices which press against each other; and
a control unit programmed to control the movement drive source and the rotary drive source based on information from the compressive load detecting unit when the end surfaces of the workpieces held by the chuck parts of the pair of holding devices are brought into contact with each other, so that the compressive load acting between the end surfaces of the workpieces which press against each other is less than a lower threshold of a bend-producing compressive load domain that would cause bending of the workpieces but the compressive load and the relative rotational speed between the workpieces are such as will cause the heat due to friction which is generated between the workpiece end surfaces to be capable of causing plastic deformation between the workpiece end surfaces, wherein
the control unit includes
a storage unit storing as setting information the rotational speed of the rotary drive source and the compressive load at the time of contact between the end surfaces of the workpieces, and
a controller controlling the movement drive source and the rotary drive source based on the information from the compressive load detecting unit and the setting information stored in the storage unit when the end surfaces of the workpieces held by the chuck parts of the pair of holding devices are brought into contact with each other, so as to cause the end surfaces of the workpieces to press against each other with a compressive load that is less than the lower threshold of the bend-producing compressive load domain and so as to cause the compressive load and the relative rotational speed between the workpieces to be such as will generate heat due to friction between the workpiece end surfaces that is capable of causing plastic deformation to occur between the workpiece end surfaces as a result of that heat due to friction.

7. The friction welding apparatus according to claim 6, wherein
the storage unit is set to store, as the compressive load at the time of contact between the end surfaces of the workpieces, a compressive load which is closer to the lower threshold of the bend-producing compressive load domain than it is to an upper limit of a non-plastically-deforming compressive load domain within which the heat due to friction capable of causing plastic deformation at the workpiece end surfaces is not generated, and wherein
the controller is set to control the movement drive source when the end surfaces of the workpieces held by the chuck parts of the pair of holding devices are brought into contact with each other, so that the compressive load acting between the end surfaces of the workpieces which press against each other is made equal to the compressive load stored in the storage unit.

8. The friction welding apparatus according to claim 6, wherein
the storage unit is set to store a compressive load larger than the compressive load at the time of contact between the end surfaces of the workpieces as a compressive load acting between the end surfaces of the workpieces which press against each other after the end surfaces of the workpieces are brought into contact with each other and to store a relative rotational speed higher than the relative rotational speed at the time of contact between the end surfaces of the workpieces as a relative rotational speed after the end surfaces of the workpieces are brought into contact with each other, and wherein
the controller is set to control the movement drive source and the rotary drive source so that after the end surfaces of the workpieces are brought into contact with each other, the compressive load acting between the end surfaces of the workpieces which press against each other is made larger than the compressive load at the time of contact between the end surfaces of the workpieces and that the relative rotational speed of the workpieces is made higher than the relative rotational speed at the time of contact between the end surfaces of the workpieces.

9. The friction welding apparatus according to claim 6, wherein
the controller is set to control the movement drive source so that after the end surfaces of the workpieces are brought into contact with each other, the compressive load acting between the end surfaces of the workpieces which press against each other is made higher than the compressive load at the time of contact between the end surfaces of the workpieces.

10. The friction welding method according to claim 1, wherein
after the end surfaces of the workpieces are brought into contact with each other, in the main friction process, at least the relative rotational speed of the workpieces is made higher than the relative rotational speed at the time of contact between the end surfaces of the workpieces to make the heat due to friction higher than the heat due to friction at the time of contact between the end surfaces of the workpieces.

11. The friction welding method according to claim 1, wherein immediately after completion of the preliminary friction process, a transition is made to the main friction process to raise the compressive load directly without passing through stages from the compressive load in the preliminary friction process to the compressive load in the main friction process larger than the compressive load in the preliminary friction process, and wherein immediately after completion of the main friction process, the compressive load is raised to the upset process pressure directly without passing through stages.

12. The friction welding apparatus according to claim 6, wherein the storage unit is set to store a compressive load larger than the compressive load at the time of contact between the end surfaces of the workpieces as a compressive load of the end surfaces of the workpieces pressing each other after the end surfaces of the workpieces are brought into contact with each other and to store as a rotational speed of the rotary drive source a constant rotational speed used throughout the process of generating the frictional heat, and wherein the controller is set to control the movement drive source and the rotary drive source so that the relative rotational speed of the workpieces is maintained at the constant rotational speed while the heat due to friction is generated, while the compressive load acting between the end surfaces of the workpieces which press against each other is made larger after the end surfaces of the workpieces are brought into contact with each other than the compressive load at the time of contact between the end surfaces of the workpieces.

* * * * *